United States Patent [19]
Okamoto et al.
[11] Patent Number: 4,908,492
[45] Date of Patent: Mar. 13, 1990

[54] MICROWAVE PLASMA PRODUCTION APPARATUS

[75] Inventors: Yukio Okamoto, Sagamihara; Seiichi Murayama, Kokubunji, both of Japan

[73] Assignee: Hitachi, Ltd., Tokyo, Japan

[21] Appl. No.: 347,573

[22] Filed: May 5, 1989

[30] Foreign Application Priority Data

May 11, 1988 [JP] Japan ................................ 63-112563

[51] Int. Cl.⁴ ................................................ B23K 9/00
[52] U.S. Cl. .......................... 219/121.52; 219/121.48; 219/121.47; 219/121.36; 219/10.55 A; 315/111.21
[58] Field of Search ................ 219/10.55 R, 10.55 A, 219/10.55 F, 121.52, 121.48, 121.36, 121.40, 121.42, 121.47, 75; 313/231.31, 231.41; 315/111.21, 111.51

[56] References Cited

U.S. PATENT DOCUMENTS

| | | | |
|---|---|---|---|
| 3,980,855 | 9/1976 | Boudouris et al. | 219/10.55 A |
| 4,110,595 | 8/1978 | Brambilla et al. | 219/121.48 |
| 4,221,948 | 9/1980 | Jean | 219/10.55 A |
| 4,339,326 | 7/1982 | Hirose et al. | 219/10.55 A |
| 4,473,736 | 9/1984 | Bloyet et al. | 219/121.52 |
| 4,543,465 | 9/1983 | Sakudo et al. | 219/121.43 |

FOREIGN PATENT DOCUMENTS

| | | | |
|---|---|---|---|
| 2837594 | 3/1979 | Fed. Rep. of Germany | 219/121.59 |
| 2028988 | 3/1980 | United Kingdom | 219/10.55 A |

*Primary Examiner*—M. H. Paschall
*Attorney, Agent, or Firm*—Antonelli, Terry & Wands

[57] ABSTRACT

A microwave plasma production apparatus according to the present invention is so configured that a cylindrical coaxial wave guide is formed by a cylindrical outer conductor and a helical coil shaped inner conductor, and at least a part of a nonconductive discharge tube is disposed inside said inner conductor, microwave being applied between said outer conductor and said inner conductor.

5 Claims, 5 Drawing Sheets

MICROWAVE PLASMA PRODUCTION APPARATUS

BACKGROUND OF THE INVENTION

The present invention relates to a plasma production apparatus (plasma source) using microwave power as an excitation source. For example, the present invention relates to a microwave plasma production apparatus which can be used as an emission source or a particle (ion, radical etc.) source in etching, deposition, surface treatment, surface modification and trace element analysis of a material, or as a high-brightness short-wave light source of optical reaction.

Conventional plasma production means using power of microwave (1 GHz or higher) are discussed in (1) Rev Sci. Instrum., 36, 3 (1965), pp. 294 to 298, (2) IEEE Trans. of Elect. Plasma Sci., PS-3, 2 (1975), pp. 55 to 59, and (3) Rev. Sci. Instrum., 39, 11 (1968), pp. 295 to 297, for example.

On the other hand, plasma production means using RF power of several hundred MHz or lower are discussed in (4) Philips Tech. Rev., 23, 2 (1973) pp. 50 to 59, for example.

In the prior art using microwave power as described in aforementioned literatures (1), (2) and (3), the structure is complex, and dimensions are limited. No attention is paid to improvement of utilizing efficiency of microwave power, realization of large-diameter and high-density plasma, optimization of radial distribution of plasma, and increase of exciting microwave power. There are problems in physical quantity (such as density) of plasma and its production efficiency, characteristics and throughput of film material obtained when plasma is used for deposition, and sensitivity and cost in an analyzing apparatus obtained when plasma is used for trace element analysis.

On the other hand, the prior art using RF power as described in the aforementioned literature (4) has a complex constitution of an oscillator. There are thus problems in utilizing efficiency of RF power, electric wave obstacle countermeasure and cost.

SUMMARY OF THE INVENTION

An object of the present invention is to provide a microwave plasma production apparatus which overcomes the above described problems of the prior art and which is capable of generating high-temperature, high-density, low-impurity plasma stably and efficiently.

The above described object is achieved by a microwave plasma production apparatus comprising a cylindrical coaxial wave guide having a cylindrical outer conductor and a helical coil shaped inner conductor, and an insulator discharge tube at least a part of which is disposed inside the above described inner conductor wherein microwave power is supplied between the above described outer conductor and inner conductor.

In the microwave plasma production apparatus of the present invention, a discharge tube is thus disposed inside the helical coil shaped inner conductor of the cylindrical coaxial wave guide, and microwave power is used. Accordingly, limitations placed on the dimension and shape by the microwave excitation frequency are eliminated. In addition, it allows a large current proportional to the product of the excitation current and the microwave excitation frequency to flow in the plasma. Further, owing to improvement of skin depth in skin effect due to the raised frequency and application of an external magnetic field, it is possible to generate high-density and high-temperature plasma above cut-off density having radial distribution meeting the object and having an arbitrary diameter efficiently and easily.

Therefore, plasma generated by a present invention apparatus can be used for plasma processing such as etching processing and deposition processing of semiconductor materials. Further, plasma generated by the present invention apparatus has a merit that it can be widely used as the emission source and ion source in creation of a new material, surface treatment, surface modification and trace element analysis and further as a high-brightness short-wave light source for optical reaction.

BRIEF DESCRIPTION OF THE DRAWINGS

FIG. 3 is a block configuration diagram for a case where plasma is used for plasma processing of a material.

FIG. 4 is a block configuration diagram for a case where plasma is used for surface treatment of a material.

FIG. 5 is a block configuration diagram for a case where plasma is used for trace element analysis.

FIG. 6 is a block configuration diagram for a case where plasma is used for opto-chemical reaction.

DESCRIPTION OF THE PREFERRED EMBODIMENTS

First of all, the principle of the present invention will now be described.

In such configuration that microwave is used as the excitation source and a discharge tube is disposed inside a helical coil shaped inner conductor of a cylindrical coaxial wave guide to produce plasma, the helical coil shaped inner conductor equivalently functions as a primary coil of a transformer, whereas plasma equivalently functions as a secondary coil (the number of turn: one turn) of the transformer.

Thereby, the dimensions and shapes of inner and outer conductors can be freely set. Therefore, it is possible to obtain plasma having a diameter meeting the object of use with simple configuration. Further, the outer conductor functions as a shielding case as well.

Further, a discharge current $I_2$ flowing through plasma is in proportion to the product of an excitation current $I_1$ flowing through the above described primary coil and an excitation frequency f (i.e., $I_2 \propto f \cdot I_1$) For making the discharge current $I_2$, therefore, it is effective to make the excitation frequency f large. In case microwave (1 GHz or higher) is used, therefore, the discharge current $I_2$ can be increased to 10 times or more even when $I_1$ is made constant as compared with the case RF (100 MHz or lower) is used. When microwave is used, high-density, high-temperature plasma can be obtained efficiently and used as a high-brightness light source as well.

Further, skin depth $\delta$ is in inverse proportion to the square root of the excitation frequency f (i.e., $\delta \propto 1/\sqrt{f}$). If microwave having a larger value of f is used, therefore, $\delta$ becomes smaller and a large discharge current flows in the periphery portion of plasma. As the position advances to the peripheral portion of plasma, therefore, the outward electric field intensity $E_0$ becomes larger. Especially at a higher discharge gas pressure, the electric field intensity functions to produce doughnut-shaped or toroidal-shaped plasma efficiently. At a lower discharge gas pressure, the above described $E_0$ compensates for diffusion loss and hence functions to produce uniform plasma having a large diameter.

Embodiments of the present invention will now be described by referring to FIGS. 1A, 1B and 2 to 6.

Figure 1A:
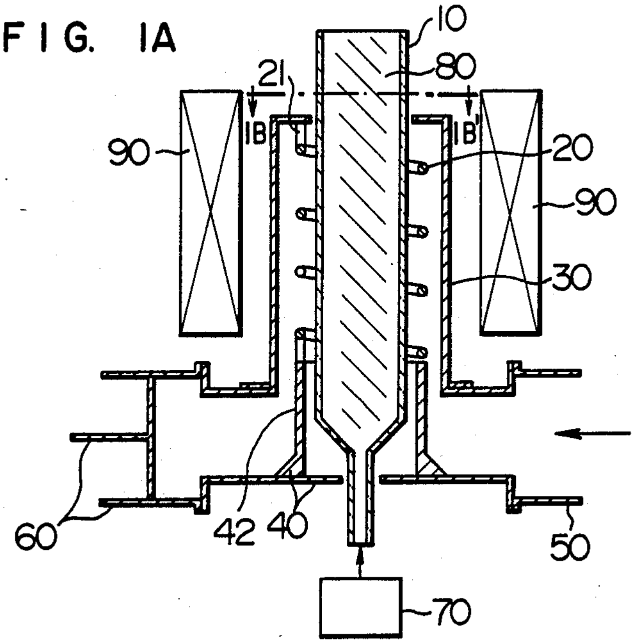
FIG. 1A shows a sectional view of an embodiment of a microwave plasma production system according to the present invention.
Figure 1B:
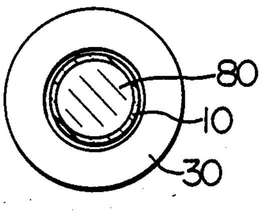
FIG. 1B shows a sectional view along 1B-1B' in FIG. 1A.

FIG. 1A shows a sectional view of a microwave plasma production system forming the basis of the present invention, and FIG. 1B shows a sectional view along 1B-1B' of FIG. 1A. In the plasma production system of the present embodiment, a cylindrical outer conductor (copper) 30, a helical coil shaped inner conductor (formed by coiling a copper wire or pipe by approximately 1 to 10 turns with a pitch of 0.5 cm and inner diameter of 0.1 to 10 cm, for example) 20, a discharge tube 10 comprising quartz glass, and a coaxial wave guide transformer 40 are arranged as illustrated. In order to transmit microwave power to the helical coil shaped inner conductor 20 efficiently, it is preferred to make the dimensions of an E-plane (direction of electric field) of the coaxial wave guide transformer 40 smaller than those of the standard type to make the characteristic impedance. In addition, it is also preferred to dispose a ¼ wave length transformer 50 at the input side of the coaxial wave guide transformer 40 and make the characteristic impedance agree with that of the coaxial section. Further, it is also preferred to dispose a plunger 60 at the opposite side to attain matching. Further, the coaxial section 42 of the coaxial wave guide transformer 40 may have a door knob shape. Especially, at a lower discharge gas pressure operation, a magnetic field generator 90 may be disposed in order to improve production and confinement of plasma. (The magnetic field generator comprises an air-core coil or a permanent magnet. The strength of the magnetic field satisfies or nearly satisfies electron cyclotron resonance condition. The magnetic field generator forms a multi-cusp magnetic field or a divergent type beach shaped magnetic field.) A front end 21 of the helical coil shaped inner conductor 20 is connected to the outer conductor 30 as illustrated. However, the front end 21 may be disconnected from the outer conductor 30.

The basic operation will now be described. Microwave power (with 2.45 GHz, 1.5 KW, and steady state or pulse modulation, for example) supplied from a microwave generator comprising a magnetron is transmitted from the coaxial wave guide transformer 40 to the helical coil shaped inner conductor 20 to produce a magnetic field in the axial direction. At this time, an electric field is induced in a direction opposite to that of a current flowing through the helical coil shaped inner conductor 20 by magnetic induction. Gas introduced from a gas sample injector 70 into the discharge tube 10 is ionized, and plasma 80 is produced and heated. A current proportionate to the product of the current flowing through the helical coil and the microwave frequency flows through the plasma 80 so as to concentrate to the peripheral portion as a result of skin effect. When the discharge gas pressure is high, therefore, temperature and density distribution of plasma takes doughnut shape or toroidal shape having peaks in the peripheral portion. If a sample to be analyzed is introduced into the inside of the doughnut, therefore, the sample is heated by thermal conduction and radiation. The sample can thus be ionized efficiently to produce plasma and can be used for trace element analysis. The operation is performed in the steady-state mode or in the unsteady-state mode (i.e., pulse mode).

In the above described embodiment, the microwave circuit is entirely constituted by a wave guide, and hence large power can be supplied. It is thus possible to obtain plasma having high temperature, high density (cut-off density or higher) and large capacity easily. As occasion demands, the discharge tube and wave guide may be cooled by compulsed air cooling or the like.

Figure 2:
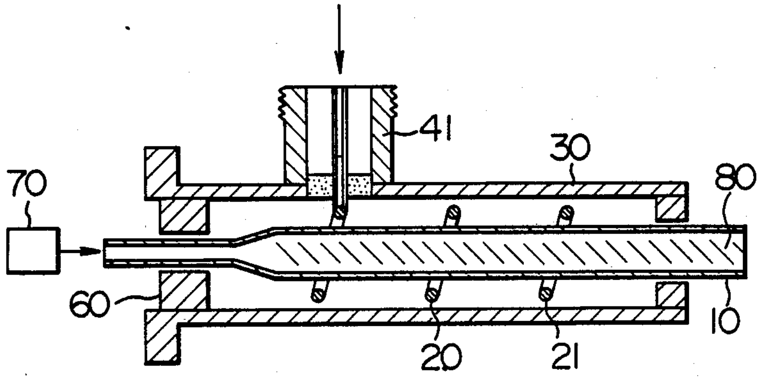
FIG. 2 is a sectional view of another embodiment of a microwave production system according to the present invention.

FIG. 2 is a sectional view of an embodiment for low power. This embodiment is characterized in that output of a microwave generator such as a magnetron is transmitted to a microwave plasma production system via a coaxial cable and a matching circuit (which may be omitted). This embodiment is suitable for low power use. In FIG. 2, numeral 41 denotes a microwave input coaxial cable connector, and other numerals denote the same components as those of the embodiment shown in FIG. 1A having like numerals. The front end 21 of the helical coil shaped inner conductor is not connected to the outer conductor 30 in FIG. 2. However, the front end 21 may be connected to the outer conductor 30.

Since diameters of the inner and outer conductor can be arbitrarily set in the present embodiment, the present embodiment has a merit that the diameter of the discharge tube 10 can also be arbitrarily set correspondingly. Therefore, the diameter of the plasma 80 can also be set arbitrarily. The present invention is useful especially when large-diameter plasma is required. In the present embodiment as well, an external magnetic field generator (90 in FIG. 1A) may be disposed at the outer periphery side of the outer conductor 30.

The shape of the discharge tube 10 and the inlet of gas and the like in the embodiments of FIGS. 1A and 2 are not restricted to those of the illustrated examples, but can be optimized in accordance with the object. Depending upon the object, $H_2$, He, $N_2$, $O_2$, Ar, Xe, Hg, $CH_4$ or $NH_3$ is selected as working gas, and the pressure in the discharge tube is set in a range of $10^{-6}$ to 760 Torr.

By referring to FIGS. 3 to 6, embodiments in which the above described microwave plasma production system is applied to a plasma processing apparatus for creating a new material using deposition or the like (FIG. 3), surface modification of a material (FIG. 4), trace element analysis (FIG. 5), and a light source of ultraviolet rays (FIG. 6) will now be described.

Figure 3:
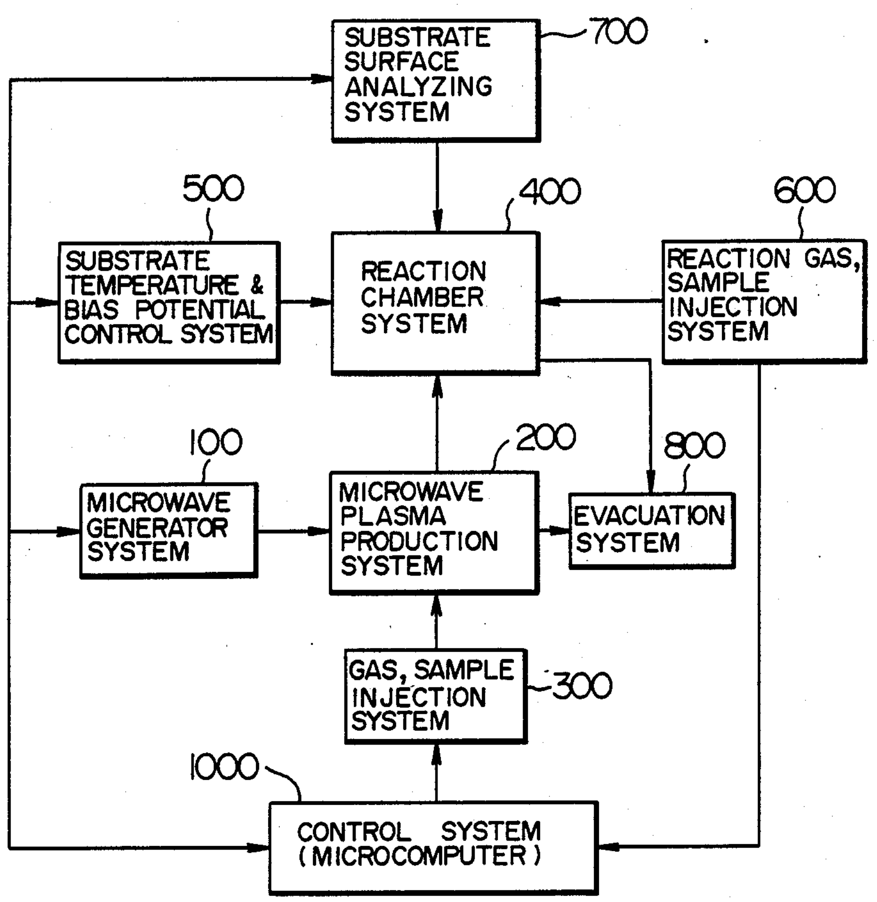
FIGS. 3 to 6 are block configuration diagrams of embodiments of an apparatus using plasma generated by the plasma production system of FIG. 1 or that of FIG. 2.

FIG. 3 is a block configuration diagram of an embodiment of the present invention, in which the above described microwave plasma production system is applied to a plasma processing apparatus for etching, deposition or the like. In FIG. 3, numeral 100 denotes a microwave generator system comprising high voltage power supply (of direct current or pulse type), a microwave generator (such as a magnetron or a gyrotron), an isolator, a power meter and an E-H tuner. Numeral 200 denotes a microwave plasma production system, which comprises components shown in FIG. 1 or 2 described before. Numeral 300 denotes a gas sample injection system, which comprises a unit for injecting gas (such as $H_2$, He, $N_2$, $O_2$, Ar, Xe or Hg singly or these mixed gas) and reaction fine particles ($BaCO_3+Y_2O_3+CuO$, a metal element such as Ba, Y or Cu, or $LaB_6$, for example). Numeral 400 denotes a reaction chamber system, which comprises a high vacuum chamber, a substrate holder, a substrate heater/cooler and a bias potential supply. Numeral 500 denotes a substrate temperature and bias potential control system, which comprises a substrate temperature and bias potential control circuit. Numeral 600 denotes a reaction gas sample injection system, which comprises a reaction gas injector for injecting reaction gas such as $CH_4$, $CF_4$ or $SiF_4$, and an electron beam or laser evaporator for producing and injecting the above described superfine particles. Numeral 700 denotes a substrate surface analyzing system, which comprises a spectrometer and a mass analyzer. Numeral 800 denotes an evacuation system, which comprises a turbo-pump for evacuating a reaction chamber included in the reaction chamber system 400 and the discharge tube included in the microwave plasma production system 200. Numeral 1000 denotes a control system comprising a microcomputer. The control system 1000 has functions of controlling the microwave generator system 100, the substrate temperature and bias potential control system 500, the gas sample injection system 300, the reaction gas sample injection system 600 and the substrate surface analyzing system 700, thereby performing optimum control of the entire apparatus (to optimize the obtained material), and putting in order and preserving various data.

Figure 4:
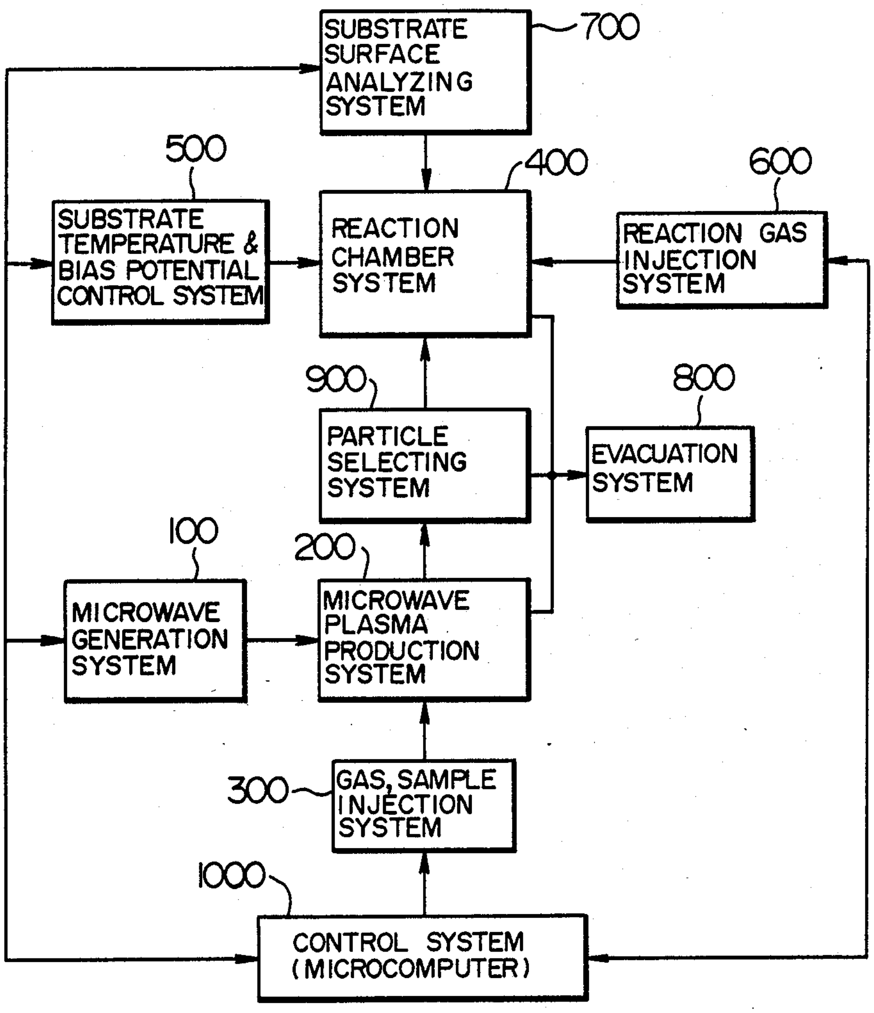

FIG. 4 is a block configuration diagram of an embodiment in which ions and neutral particles (such as radicals) are selectively taken out from generated high-density plasma to perform surface treatment and surface modification of a material. In FIG. 4, numeral 900 denotes a particle selecting system, which comprises a magnetic or electric field supply apparatus for selectively taking out ions and radicals from the microwave plasma production system 200. Other numerals denote the same components as those of the embodiment shown in FIG. 1 having like numerals. In the microwave plasma production apparatus, the above described ions and radicals directly react with the substrate to perform surface modification of the material. In addition, the microwave plasma production apparatus can also be used as an apparatus in which the above described ions and radicals strike the target once and the target material emitted therefrom is deposited on the substrate.

Figure 5:
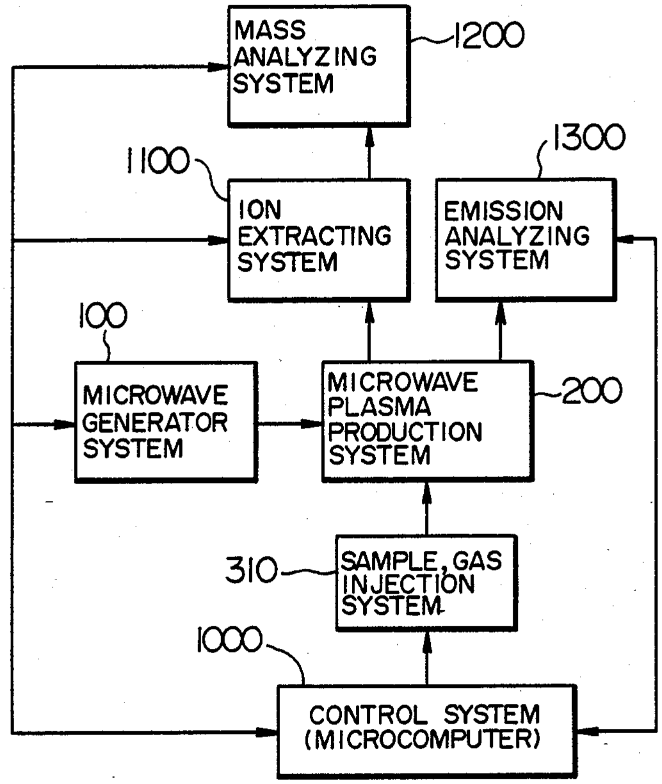

FIG. 5 is a block configuration diagram of an embodiment in which trace elements in the sample are analyzed by using light and ions emitted from the generated high-density, high-temperature plasma. In FIG. 5, numeral 310 denotes a sample gas injection system, which comprise a sample to be analyzed, carrier gas (such as He, $N_2$ or Ar), and a nebulizer for nebulizing them. Numeral 1100 denotes an ion extracting system, which comprises an electrostatic lens system including a slimmer and an Inzel lens. Numeral 1200 denotes a mass analyzing system comprising a mass filter. Numeral 1300 denotes a spectrometry comprising a spectrometer. In the element analysis according to the present embodiment, the working condition can be set so that toroidal plasma may be produced (for example, so that small-diameter plasma having a diameter of approximately 2 cm or shorter may be produced under the atmospheric pressure). High sensitivity and high efficiency can be thus advantageously attained. At this time, the discharge tube has a double or triple tube structure. Into a control tube, the carrier gas and the sample are injected. Into its outer tube, plasma gas such as He, $N_2$ or Ar is injected from the radial direction. Into its further outer tube, a refrigerant (generally gas or air) is injected from the radial direction.

Figure 6:
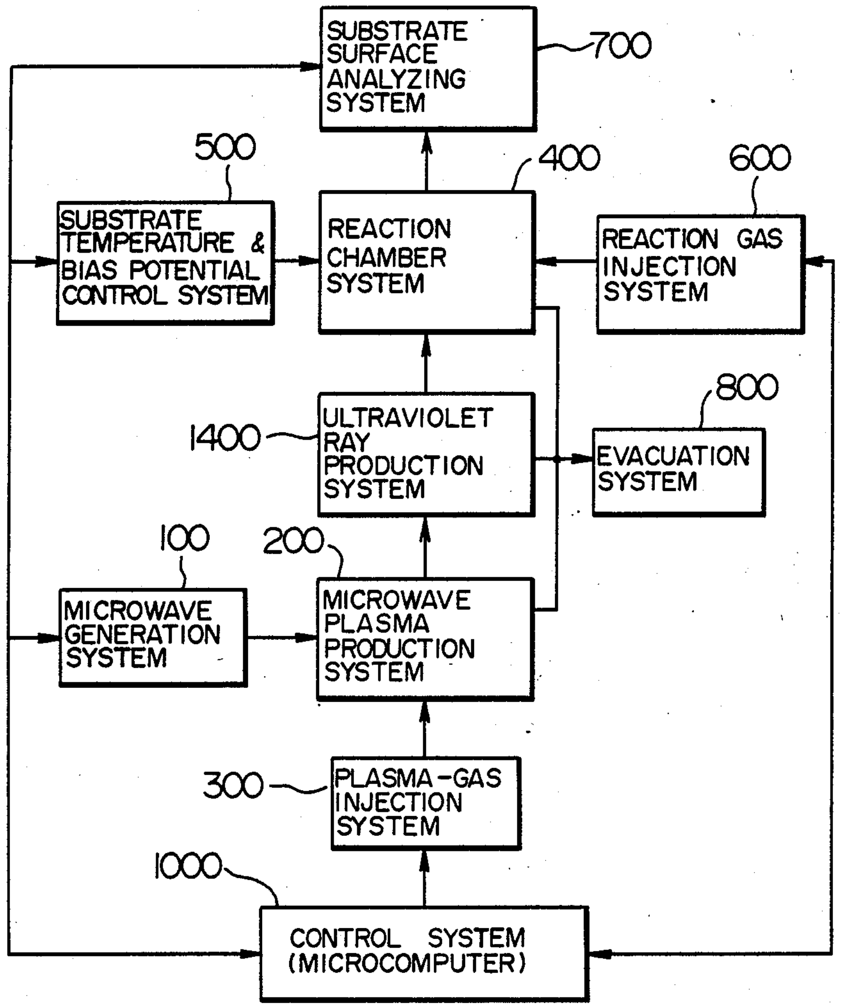

FIG. 6 is a block configuration diagram of an embodiment in which surface treatment of a material is performed by using ultraviolet rays emitted from plasma. In FIG. 6, numeral 1400 denotes an ultraviolet ray production system, which comprises a quartz plate, a $CaF_2$ plate or a metal mesh (with bias potential applied) in order to prevent diffusion of plasma into the reaction chamber system 400 and improve transmission of ultraviolet rays. As plasma, Ar-Hg or Xe is used to generate ultraviolet rays efficiently. Working condition is set (at low pressure, for example) so that uniform plasma having a large diameter may be obtained. The present embodiment can be used in fields of etching performed by activating $Cl_2$, for example, and used in opto-chemical reaction using ultraviolet rays, forming a thin film using decomposition of $SiH_4$ and epitaxial growth of Si (i.e., opto-chemical gas-phase growth), and resist ashing performed by applying light to $O_2$. The present embodiment has a merit that light having an arbitrary wavelength can be obtained with high brightness over a large area by selecting gas. In case of the present embodiment, the discharge tube (10 of FIGS. 1A and 2) disposed in the microwave plasma production system 200 may comprise a plurality of discharge tubes.

What is claimed is:

1. A microwave plasma production apparatus comprising:

a cylindrical coaxial wave guide forming a cylindrical bore and including a helical coil shaped inner conductor and a cylindrical outer conductor;

an electrically nonconductive discharge tube disposed in said cylindrical bore; and means for introducing microwave power between said inner and outer conductors and for forming a microwave electric field in said cylindrical bore so as to form plasma of a substance to be ionized introduced in said cylindrical bore.

2. A microwave plasma production apparatus according to claim 1, wherein said discharge tube has an inlet for injecting said substance to be ionized and an opening for utilizing one of said plasma, light and particles emitted from said plasma.

3. A microwave plasma production apparatus according to claim 1, further comprising magnetic field applying means so disposed around said cylindrical bore as to superimpose an external magnetic field over said microwave electric field.

4. A microwave plasma production apparatus according to claim 2, further comprising magnetic field applying means so disposed around said cylindrical bore as to superimpose an external magnetic field over said microwave electric field.

5. A microwave plasma production apparatus according to claim 1, wherein said helical coil shaped inner conductor and said plasma form a transformer with said helical coil shaped inner conductor being a primary coil and said plasma being a secondary coil of the transformer, wherein dimensions and shapes of said helical coil shaped inner conductor and said cylindrical outer conductor are enabled to be selected so that said plasma having a selected diameter is obtainable, a discharge current flowing through said plasma being proportional to the product of an excitation current flowing through said primary coil and an excitation frequency.

* * * * *